US010982159B2

(12) United States Patent
Campos

(10) Patent No.: US 10,982,159 B2
(45) Date of Patent: Apr. 20, 2021

(54) METHOD FOR REDUCING THE CONTENT OF SATURATED MONOGLYCERIDES IN A RAW BIODIESEL

(71) Applicant: GEA Mechanical Equipment GmbH, Oelde (DE)

(72) Inventor: Abel Fernandes Campos, Guetersloh (DE)

(73) Assignee: GEA Mechanical Equipment GmbH, Oelde (DE)

( * ) Notice: Subject to any disclaimer, the term of this patent is extended or adjusted under 35 U.S.C. 154(b) by 3 days.

(21) Appl. No.: 16/614,476

(22) PCT Filed: May 3, 2018

(86) PCT No.: PCT/EP2018/061318
§ 371 (c)(1),
(2) Date: Nov. 18, 2019

(87) PCT Pub. No.: WO2018/210573
PCT Pub. Date: Nov. 22, 2018

(65) Prior Publication Data
US 2020/0199471 A1    Jun. 25, 2020

(30) Foreign Application Priority Data
May 19, 2017  (EP) .................................... 17171913

(51) Int. Cl.
*C10L 1/02* (2006.01)

(52) U.S. Cl.
CPC ....... *C10L 1/026* (2013.01); *C10L 2200/0476* (2013.01); *C10L 2270/026* (2013.01);
(Continued)

(58) Field of Classification Search
CPC ............ C10L 1/026; C10L 2200/0476; C10L 2270/026; C10L 2290/08; C10L 2290/24;
(Continued)

(56) References Cited

U.S. PATENT DOCUMENTS 8,507,703 B2 * 8/2013 Jalalpoor .................. C11B 3/16
554/191
8,876,922 B2 * 11/2014 Jalalpoor ................ C11C 3/003
44/388

(Continued)

FOREIGN PATENT DOCUMENTS

WO    WO 2004/083350 A1    9/2004
WO    WO 2007/076163 A2    7/2007
(Continued)

OTHER PUBLICATIONS

International Search Report (PCT/ISA/210) issued in PCT Application No. PCT/EP2018/061318 dated Jul. 3, 2018 with English translation (10 pages).
(Continued)

*Primary Examiner* — Pamela H Weiss
(74) *Attorney, Agent, or Firm* — Crowell & Moring LLP

(57) ABSTRACT

The present invention relates to a method for reducing the content of monoglycerides (MG), also called monoacylglycerides (MAG), especially of saturated monoglycerides (SMG), in a crude biodiesel (CB).

14 Claims, 1 Drawing Sheet

(52) U.S. Cl.
CPC ....... *C10L 2290/08* (2013.01); *C10L 2290/24* (2013.01); *C10L 2290/544* (2013.01); *C10L 2290/545* (2013.01)

(58) Field of Classification Search
CPC ......... C10L 2290/544; C10L 2290/545; Y02E 50/10; C11C 1/025
See application file for complete search history.

(56) References Cited

U.S. PATENT DOCUMENTS

| | | | |
|---|---|---|---|
| 9,000,244 B2* | 4/2015 | Kozyuk | C10L 1/026 585/240 |
| 2005/0081436 A1* | 4/2005 | Bertram | B01J 20/28057 44/605 |
| 2007/0277429 A1* | 12/2007 | Jackam | C10L 1/19 44/308 |
| 2010/0024285 A1 | 2/2010 | Wang et al. | |
| 2010/0132251 A1* | 6/2010 | Sohling | B01J 20/12 44/388 |
| 2010/0175312 A1 | 7/2010 | Roden et al. | |
| 2010/0236138 A1 | 9/2010 | Bauer et al. | |
| 2011/0099889 A1* | 5/2011 | Sohling | C07J 17/005 44/307 |
| 2011/0252697 A1 | 10/2011 | Boensch et al. | |
| 2011/0288320 A1* | 11/2011 | Jalalpoor | C11B 3/10 554/191 |
| 2015/0344797 A1* | 12/2015 | Staller | C11C 3/10 44/389 |
| 2016/0145536 A1 | 5/2016 | Slade et al. | |
| 2016/0264893 A1* | 9/2016 | Toba | C10G 3/50 |

FOREIGN PATENT DOCUMENTS

| | | |
|---|---|---|
| WO | WO 2008/051984 A2 | 5/2008 |
| WO | WO 2009/106360 A2 | 9/2009 |
| WO | WO 2009/132670 A1 | 11/2009 |
| WO | WO 2010/004423 A2 | 1/2010 |
| WO | WO 2010/040428 A1 | 4/2010 |
| WO | WO 2010/102952 A1 | 9/2010 |
| WO | WO 2012/098114 A1 | 7/2012 |
| WO | WO 2013/138671 A1 | 9/2013 |
| WO | WO 2015/183744 A1 | 12/2015 |

OTHER PUBLICATIONS

German-language Written Opinion (PCT/ISA/237) issued in PCT Application No. PCT/EP2018/061318 dated Jul. 3, 2018 (11 pages).

European-language Search Report issued in counterpart European Application No. 17171913.1 dated Nov. 22, 2017 with partial English translation (13 pages).

Chongkhong S. et al., "Continuous Esterification for Biodiesel Production from Palm Fatty Acid Distillate Using Economical Process", Renewable Energy, 2009, pp. 1059-1063, vol. 34, XP25673519AI, (five (5) pages).

Atadashi I.M. et al., "Biodiesel Separation and Purification: A Review", Renewable Energy, 2011, pp. 437-443, vol. 36, XP27383535AI, (seven (7) pages).

Cover page of EP 2285940 A1 published Feb. 23, 2011 (one (1) page.

"Biodiesel: Recommendation on Additional Requirements for FAME As Blend Component for Diesel Fuel Beyond DIN EN 14214", Association Quality Management Biodiesel (AGQM), Oct. 21, 2010, Berlin, DE, (four (4) pages).

"Biodiesel Analytics: Important Parameters and Their Meaning", Association Quality Management Biodiesel (AGQM), Nov. 2012, Berlin, DE, (four (4) pages).

Chupka et al., "Saturated Monoglyceride Effects on Low-Temperature Performance of Biodiesel Blends", Fuel Processing Technology, 2014, vol. 118, pp. 302-309, (eight (8) pages).

"Internal Diesel Injector Deposits", CRC Diesel Performance Group, Oct. 2013, CRC Report No. 665, Alpharetta, GA, (15 pages).

Fersner et al., "Biodiesel Feedstock and Contaminant Contributions to Diesel Fuel Filter Blocking", SAE Int. J. Fuels Lubr., Nov. 2014, vol. 7, No. 3, pp. 783-787 (five (5) pages).

Harndorf et al., "Änderungen Von Kraftstoffeigenschaften Unter Extremen Randbedingungen—Ablagerungen in Common Rail Injektoren II", Jan. 2015, with partial English Translation, (175 pages).

Reid et al., "Internal Injector Deposits From Sodium Sources", SAE Int. J. Fuels Lubr., Jun. 2014, vol. 7, No. 2, (nine (9) pages).

Steins., "Biodiesel Quality and EN 14214:2012", Analytik-Service Gesellschaft (ASG), with English translation, (16 pages).

\* cited by examiner

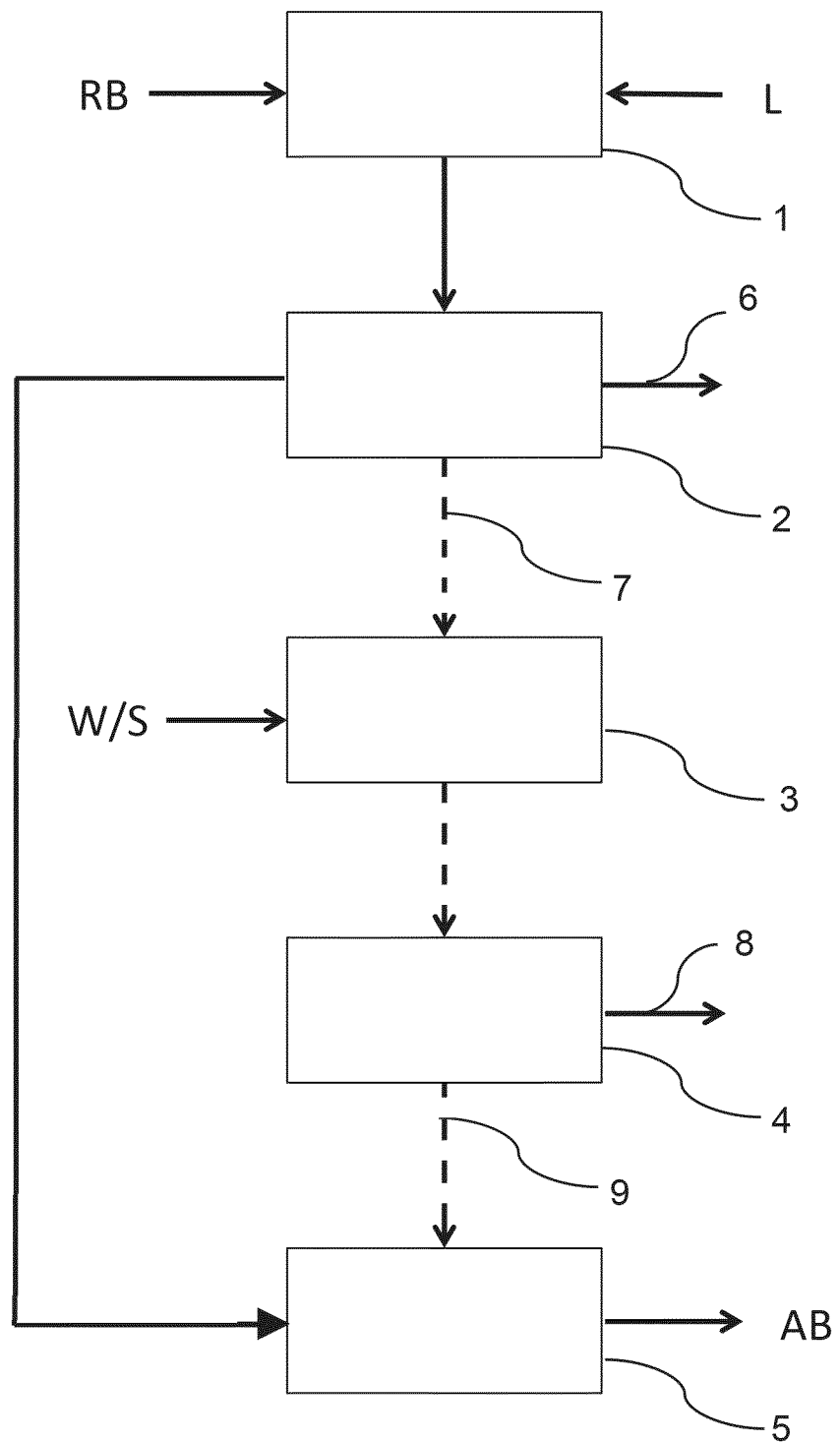

METHOD FOR REDUCING THE CONTENT OF SATURATED MONOGLYCERIDES IN A RAW BIODIESEL

The present invention relates to a method for reducing the content of monoglycerides (MG), also called monoacylglycerides (MAG), especially of saturated monoglycerides (SMG), in a crude biodiesel (CB).

In the biodiesel production method process, glycerides cannot be converted to an extent of 100% as monoalkyl esters and therefore remain as impurities in the solution. The literature (G. M. Chupka, et al.: Saturated monoglyceride effects on low-temperature performance of biodiesel blends, Journal of the Fuel Processing Technology, vol. 118, 2014, pp. 302-309/Fersner, et al.: Biodiesel Feedstock and Contaminant Contributions to diesel Fuel Filter Blocking, SAE Int. J. Fuels Lubr., vol. 7(3), Nov. 2014, pp. 783-791) says that, at low temperatures, MG and SMG solid deposits are formed in diesel engine filters or injection nozzles. Further final reports and publications (CRC Report no. 665, Internal Diesel Injector Deposits, October 2013/H. Harndorf, et al.: Änderungen von Kraftstoffeigenschaften unter extremen Randbedingungen—Ablagerungen in Common Rail Injektoren II [Changes in fuel properties under extreme boundary conditions—deposits in common rail injectors II], University of Rostock, no. 1095, Jan. 2015/Reid, J., Cook, S., and Barker, J.: Internal Injector Deposits from Sodium Sources, SAE Int. J. Fuels Lubr., vol. 7(2), Apr. 2014, pp. 436-444) mention sodium carboxylates as one of the principal causes of the deposition of solids in the injection nozzles of diesel engines.

EN 14214: 2014-6 defines a maximum content of MG of 0.70% by weight for conventional biodiesel. In contrast, ASTM D6751-15ce defines a maximum content of MG of 0.40% by weight for what is known as the 1-B grade of biodiesel, also called winter biodiesel.

No restriction for these parameters is placed on what is known as the 2-B grade of biodiesel. To the present day there is no restriction on SMG, although the literature (AGQM, Biodiesel Analytics Important Parameters and their Meaning, In: Technical Bulletin, November 2012 or AGQM, Biodiesel Recommendation on Additional Requirements for FAME as Blend Component for Diesel Fuel beyond DIN EN 14214, October 2010, and also EN14214:2012 Annex I-V) has discussed a limitation of this compound within the scope of a standard. Sterol glycosides and acylated sterol glycosides are measured indirectly as one of the biodiesel impurities.

The threshold values are—in Europe, in terms of total contamination—at most 24 mg/kg and—in the USA, in terms of CSFT—200 s for the 1-B grade or 360 s for the 2-B grade.

Oils from various sources are used for biodiesel production. So-called first-generation biofuels use vegetable oils as raw material for biodiesel production, such as: soya oil, rapeseed oil, palm oil or sunflower oil. Second-generation biofuels use: used fats, animal fats or fatty acids.

Furthermore, WO 2004/083350 A1 is concerned with the reduction of the amount of sulfur compounds in biodiesel. Here, an alkaline medium is used with a subsequent distillation.

WO 2012/098114 A1 concerns the enzymatic production of biodiesel with a final purification by washing with an alkaline agent for reducing the amount of the free fatty acid.

In recent years, documents have been published which address the reduction of the amount of biodiesel impurities that cause deposits at lower temperatures. WO 2007/076163 A2 discloses a reduction in MG using magnesium silicate. U.S. Pat. No. 9,000,244 B2 utilizes cavitation reactors for improved conversion. US 2016/0264893 A1 describes a reduction in MG by hydrogenation and filtration of biodiesel. US20100236138 A1 teaches the use of ion-exchange resin in order to reduce the amount of impurities in the biodiesel. Finally, WO 2008/051984 A2 discloses a membrane filtration for reducing the amount of biodiesel impurities that are responsible for filter blocking.

WO 2010/040428 A1 is among the documents concerned with a reduction in the amount of sterol glycoside using a water washing column; EP2285940 A1 discloses a method for removing steryl glycoside from biodiesel by means of adsorption by smectite-silica gel; US20100236138 A1 describes the use of ion-exchange resin; in the teaching of WO 2008/051984 A2 is a membrane filtration disclosed in order to reduce the amount of biodiesel impurities; WO 2009/106360 A2, WO 2010/004423 A2, WO 2010/102952 A1 and WO 2013/138671 A1 each describe methods for reducing steryl glycoside by using enzymes and amino acids.

Proceeding from the above-described prior art, it is now the object of the present invention to provide a method for reducing the content of monoglycerides MG, especially of saturated monoglycerides SMG, in a crude biodiesel which already satisfies the requirements of the currently existing EU standards but which still needs to be further purified in order to also satisfy the requirements of the US market.

The present invention achieves this object by a method having the features of claim 1.

The method of the invention serves to reduce the content of MG, especially of SMG, in a crude biodiesel which has a content of MG of between 0.4% and 0.7% by weight and a content of free fatty acids (FFA) of less than or equal to 0.25% by weight.

The method of the invention comprises the following steps:

A provision of the crude biodiesel with the abovementioned ingredients in the abovementioned concentrations of monoglycerides MG and free fatty acids.

B addition of an alkaline aqueous solution to the crude biodiesel.

C mixing of the alkaline aqueous solution to hydrolyze glycerides in the biodiesel, preferably monoglycerides MG, especially saturated monoglycerides SMG.

D centrifugal separation within the scope of a first centrifugal separation of a heavy phase, comprising the alkaline aqueous solution with the hydrolyzed ingredients, in particular the hydrolyzed monoglycerides MG, from a light phase comprising the biodiesel.

E drying of the light phase so that the final product is provided in the form of a processed biodiesel for use as fuel with a content of MG of less than 0.4% by weight.

Monoglycerides are one of the causes of blockages in filters and injection nozzles in diesel engines. One advantage of this invention is the reduction in impurities that are associated with deposits which are at the root of the abovementioned blockages.

A further advantage of this invention is the increase in biodiesel purity.

Advantageous configurations of the invention are provided by the dependent claims.

It is advantageous if, after the centrifugal separation as per step D and before the drying as per step E, washing of the light phase with water and/or with a dilute acid is optionally effected, as is, likewise optionally, a second centrifugal separation of a heavy phase comprising the water or the dilute acid from a light phase comprising the biodiesel. This step can be effected, but the concentration of sodium ions in the biodiesel may also already be so low that washing is not absolutely necessary.

The crude biodiesel, as starting material for the method, preferably satisfies the requirements of EU standard EN 14214:2014-6.

The processed biodiesel preferably satisfies US standard ASTM D6751-15ce grade 1-B.

The aqueous alkaline solution may advantageously be an alkali metal hydroxide solution or alkaline earth metal hydroxide solution, preferably a sodium hydroxide solution. Alkali metal and alkaline earth metal ions may be removed again from the biodiesel by washing. In addition, the use of sodium hydroxide solution is associated with relatively low costs.

The NaOH concentration in the sodium hydroxide solution is advantageously less than 4.03 mol/l, preferably between 0.51 mol/l and 2.77 mol/l. The amount of sodium hydroxide solution metered in is additionally advantageously between 0.5% to 3.0% by weight, based on the amount of crude biodiesel. The processed biodiesel for use as fuel should also have only a low concentration of alkali metal and alkaline earth metal ions, in particular also of sodium ions. At the addition, in the abovementioned volumes and/or concentrations of sodium ions, is the concentration of sodium ions in biodiesel below 5 ppm, preferably even below 1 ppm, and thus is even so low that washing of the biodiesel is not necessary.

For an improved viscosity and a higher rate of reaction in the hydrolysis, it is advantageous if the temperature of the crude biodiesel during the addition of the aqueous alkaline solution is at least 30° C., preferably at least 50° C.

For an optimal adjustment of the reaction equilibrium, the holding time after the addition of the aqueous alkaline solution and before the first centrifugal separation can advantageously be at least 15 minutes, preferably 30 to 180 minutes.

The first centrifugal separation may advantageously be effected by a separator at a speed of 4400 to 7200 rpm. The speed can vary depending on the plant performance.

The pH of the dilute acid during the washing can advantageously be between pH=3 and pH=5. This can result in particularly good removal of the sodium ions from the biodiesel.

The dilute acid can advantageously be a phosphoric and/or citric acid.

The content of MG in the processed biodiesel may preferably even be below 0.3% by weight.

The percentage reduction in SMG in the processed biodiesel in relation to the crude biodiesel can at least be in the same proportion or be larger than the percentage reduction of MG in the processed biodiesel in relation to the crude biodiesel. This is surprising, since unsaturated monoglycerides typically exhibit better solubility.

The invention likewise provides the use of a biodiesel (PB) according to ASTM D6751-15ce 1-B for an internal combustion engine of an internal combustion machine, produced by the method of the invention.

The above-described advantageous configurations encompass the advantages of the use of an inexpensive chemical for reducing the MG content and the reduction of the process costs by way of the reduction or complete omission of excess alkaline catalyst (such as e.g. sodium methoxide), in order to achieve the MG value of below 0.40% by weight according to ASTM D6751-15ce 1-B.

In contrast to what is described in WO2015183744A1, where, as side reaction in the neutralization of free fatty acids using an alcohol-alkali solution, MG are also reduced, it is a further advantage that the chemical used to reduce the MG content is not explosive and therefore complex and costly explosion protection safety measures are not necessary. This document describes a transesterification of monoacylglycerides by means of methanol. On account of the use of flammable substances, defined components of the process plant for the processing must satisfy the relevant locally applicable explosion protection requirements that are defined, for example, in ATEX, IEC or NEC, which makes the method and the process plant maintenance-intensive and expensive.

The limit for MG under the standard EN14214: 2014-06 is currently 0.70% by weight. The US limit for MG under the standard ASTM D6751-15ce for grade 1-B (winter biodiesel) is 0.40% by weight at present, that is to say at the time of the priority-substantiating first filing of the present invention. Grade 2-B has no limit in the USA.

The method of the invention achieves a reduction in the MG below 0.40% by weight, even below 0.30% by weight, this being achieved with a substantially less complicated method execution than was proposed in the prior art. For instance, an MG content of 0.40% by weight has to date been primarily by way of increased catalyst consumption, achieved by using a cavitation mixer (U.S. Pat. No. 9,000, 244 B2) or by biodiesel distillation, and also silica filtration (WO 2007/076163 A2), by membrane filtration (WO 2008/051984 A2), by using an ion exchanger (US20100236138 A1) or by catalytic hydrogenation (US 2016/0264893 A1).

A continuous treatment process for crude biodiesel, in particular in large-scale plants, as is possible in the present method, cannot be achieved with a large number of the abovementioned proposed solution.

The reaction temperature during the hydrogenation should be below the boiling point of the biodiesel, which is accompanied by advantages in terms of energy with respect to a biodiesel distillation. A further advantage with respect to a distillation is that the natural antioxidants are not discharged as residue by the distillation and thus can increase oxidation stability.

The method and the associated comparatively uncomplicated apparatus set-up can be added to any biodiesel plant or even at the premises of ultimate biodiesel customers such as petroleum refineries, without intervention in the process as would be the case, for example, when using cavitation mixers as per the prior art.

It may be the case that the crude biodiesel still includes small amounts of residual alcohol either in the form of intrinsic content or from preceding production steps, for example during processing in a refinery. The residual alcohol is predominantly methanol. This is capable of reducing monoglycerides.

The content of methanol in the biodiesel, in particular the total alcohol content in the biodiesel, that is to say the proportion of methanol, ethanol, propanol etc., in steps A-E is less than 0.7% by weight, preferably 0.2% by weight, and particularly preferably less than 0.05% by weight, based on the total weight of crude biodiesel used or processed biodiesel in the respective process step.

The low content of alcohol additionally shows that at this point there is no transesterification reaction with methanol, which is known from for example WO2015183744A1, and instead that the low content of MGs can be attributed to the addition of aqueous alkali solution in combination with a centrifugal separation.

Steps A-E, or B-E, may preferably be effected without alcohol, i.e. without addition of alcohol to the crude biodiesel or to the intermediate product from the crude biodiesel during the method steps used in the method. Although the crude biodiesel used may contain a low residual alcohol content, no additional alcohol is added in the method in steps A-E or B-E.

Steps A-E, or B-E, may preferably be effected without hydrogen, i.e. without addition of hydrogen to the crude biodiesel or to the intermediate product from the crude biodiesel during the method steps used in the method. Hydrogenation of the MGs with hydrogen likewise leads to special protective measures in the execution of the method.

The relevant standards for the EU and the US shall be explained once more below:

In order to avoid flocculation at low temperatures, and also to prevent sodium carboxylates, which are one of the causes of blockage of diesel injection nozzles, from subsequently forming when blending with sulfur-free diesel fuel (ultra-low-sulfur diesel), undesired substances must be removed from monoalkyl ester during processing. Some of these impurities are referred to as monoglycerides [MG], saturated monoglycerides [SMG], steryl glycosides [SG] and/or acylated steryl glycosides [ASG].

The international standards [EN14214:2014-06, ASTM D6751-15ce] define standards for multiple biodiesel properties. The standards for Europe and the USA have been adopted fully or partially by many countries across the entire world. The most recent US standard ASTM D6751-15ce defines two types of biodiesel: grade 1-B (winter biodiesel) with stricter threshold values for MG and cold soak filterability test (CSFT), and grade 2-B with unchanged standards. The latest European standard EN14214: 2014-06 has also set tighter limits.

Biodiesel specifications and test methods according to the above standards for the parameters of total contamination, CSFT and monoglycerides are compared in table 1 below:

| Parameter | ASTM D6751-15ce | | | EN14214:2014-06 | |
|---|---|---|---|---|---|
| | 1-B | 2-B | Method | | Method |
| Total contamination, max. | — | — | — | 24 mg/kg | EN 12662 |
| CSFT, s, max. | 200 | 360 | D7501 | — | — |
| Monoglycerides, max. | 0.40 % by weight | Report | D6584 | 0.70 % by weight | EN14105 |

The invention will be explained in more detail hereafter on the basis of a specific exemplary embodiment and multiple examples. In the FIGURE:

FIG. 1 shows a flowchart of a working example of the method of the invention.

The starting material for treatment in the present method is a crude biodiesel. This crude biodiesel may already have undergone a number of preceding processing steps and may already comply with the guideline specifications in respect of its composition according to the standard EN14214:2014-06 in every parameter.

However, the crude biodiesel differs from the processed biodiesel in its higher proportion of MG after treatment thereof by the method of the invention.

For instance, the crude biodiesel CB may have a proportion of MG of more than 0.40% by weight, preferably between 0.6% to 0.8% by weight, or a total content of glycerol of 0.25% by weight.

The present method can reduce the MG content in the processed biodiesel to below 0.40% by weight.

The proportion of saturated monoglycerides (SMG) in the MG can also be improved, especially proportionally to the reduction in MG.

The processed biodiesel PB has a substantially higher quality, displays less of a tendency to deposits and has better compatibility with the engine of an internal combustion machine.

According to the US standard ASTM D6751-15ce, the MG content in biodiesel should be below 0.40% by weight. Such a content can be realized by the present method with comparatively uncomplicated method execution. The MG content can preferably even be lowered to below 0.30% by weight.

The crude biodiesel used can be a biodiesel which already satisfies the standard EN14214:2014-06, that is to say satisfies an MG content of below 0.70% by weight, but which does not satisfy the MG content according to ASTM D6751-15ce 1-B, that is to say has an MG content of higher than 0.40% by weight.

FIG. 1 gives a schematic description of a configuration variant of the method of the invention, consisting of a reaction stage 1 with subsequent centrifugal separation 2 of MG, a washing stage 3 with subsequent centrifugal separation 4 of the water phase, and a drying stage 5.

Reaction stage 1 comprises initially supplying crude biodiesel CB to a mixing tank. An aqueous alkaline solution S, preferably a sodium hydroxide solution, is then added.

The concentration of sodium hydroxide in the sodium hydroxide solution metered in is advantageously less than 4.03 mol/l, particularly preferably between 0.51 mol/l and 2.77 mol/l.

The amount of sodium hydroxide solution metered in, based on the amount of crude biodiesel initially charged, is preferably between 0.5% and 3.0% by weight per kg of crude biodiesel, particularly preferably between 1.5% and 2.5% by weight per kg of crude biodiesel. The sodium hydroxide solution preferably contains water as solvent.

The aqueous alkaline solution is preferably metered into the crude biodiesel in continuous operation.

The temperature in the mixing tank is preferably 20 to 70° C., particularly preferably between 30 to 60° C. For the mixing of the alkali and the crude biodiesel, a dynamic or a static mixer may preferably be used.

During the reaction of the alkali with the various glycerides present in the crude biodiesel, a transfer occurs of the now-hydrolyzed monoacylglycerides from the crude biodiesel into the aqueous phase/aqueous alkaline solution.

The mixture of biodiesel and aqueous alkaline solution S is then conveyed into a first stirred vessel. The holding time within the stirred vessel is 15 to 180 minutes, preferably 60 to 90 minutes. A stirrer system is arranged within the stirred vessel and operates at a speed of preferably 25 to 120 rpm.

From the first stirred vessel, the mixture of biodiesel and aqueous alkaline solution can be separated within the scope of a first centrifugal separation 2 into a heavy phase 6 and a light phase 7. For this purpose, a separator for example may be used, preferably one with a vertical axis of rotation.

The heavy phase 6 in this case is the alkaline aqueous solution containing the various hydrolyzed MGs, especially SMG, and methyl esters.

The light phase 7 essentially comprises biodiesel which has a markedly lower content of MG, especially SMG and methyl esters. It has surprisingly been found here that the reduction in the content of SMG is at least proportional to the reduction in the total content of MG.

The centrifugal separation 2 is preferably effected between 4400 and 7200 rpm, depending on the plant performance. Continuous feed rates of 5 m$^3$/h to 50 m$^3$/h or more per centrifuge can thus be treated. The high centrifugal force (g-force) of up to 10 000×G or more means that a maximum separating efficiency is achieved during continuous operation. These separators are equipped with disk stacks which offer a large equivalent clarifying area of up to approximately 400 000 m$^2$ and hence very effective for the separation of suspensions that consist of two or more phases having different densities. They can be used for a liquid-liquid, liquid-liquid-solid or for a liquid-solid separation. In each case, the liquid phase is discharged continuously. There are different variants for the discharge of solids: discontinuous (for example in the case of solid bowl centrifuges that need to be stopped in order to manually remove the accumulated solid), semicontinuous (self-cleaning centrifuges that automatically periodically empty the solid that has accumulated in the sludge space).

Separators can be equipped with a so-called finetuner which allows optimal separation of the suspensions.

Separators having a hydrohermetic infeed pipe may be used. This specially designed infeed pipe protects the product from high shear forces by means of gentle infeed and simultaneously prevents oxygen uptake.

The separators are available with various drive types: gear drive, belt drive, direct drive and integrated direct drive. The integrated direct drive represents the latest stage of development in the process of separator design, because it operates without gears, belts, clutch and motor supports. The small number of installed components reduces not only energy losses but also maintenance costs, and increases machine availability. The space requirement of the integrated direct drive is around one third smaller than in comparable machines with gear drive or flat belt drive. Separators with integrated direct drive can in addition be operated in a very flexible manner. Within a certain range, the bowl speed is infinitely variable without a change in the transmission ratio. Changing the bowl speed offers a further option in terms of separation efficiency. The innovative design of the integrated direct drive moreover allows exchange of the motor complete with drive within only a few hours in the event of maintenance.

The light phase, i.e. the biodiesel, is then washed with water W in a washing stage 3. For the purpose of increasing the solubility of hydrolyzed constituents in the biodiesel, the temperature of the water is higher than the temperature of the biodiesel, preferably more than 30° C., particularly preferably between 40 and 70° C.

The water used is preferably demineralized water in order to avoid any additional introduction of ions.

The amount of water supplied in washing stage 3 is between 2.0% and 10.0% by weight, based on the weight of the biodiesel, preferably between 3.0% and 5.0% by weight.

The water W is mixed with the biodiesel after or during the supplying of the water. For the mixing of the water and the biodiesel, a dynamic or a static mixer may preferably be used.

The water W supplied in the washing stage 3 can alternatively take the form of dilute acid A, for which purpose an acid is preferably metered into the abovementioned hot demineralized water in order thus to prepare the dilute acid A. The acid metered in is preferably citric acid or particularly preferably phosphoric acid. The acid can be metered in in concentrated or dilute form, wherein the pH of the dilute acid A used for the washing in the washing stage 3 is preferably between pH=3 and 5, in particular between pH=3.5 and 4. Sodium salts can be precipitated by the addition of acid. They can then be separated out together with the heavy phase 8 during the subsequent centrifugal separation.

The mixture of water W, dilute acid A and biodiesel is separated in a second centrifugal separation 4 into a light phase and a heavy phase 9, 8. The centrifugal separation may preferably be effected in a separator, especially in a separator with a vertical axis of rotation.

The centrifugal separation 4 is effected with similar or identical centrifuges to those in the centrifugal separation 2.

The heavy phase 8 comprises the water/acid phase including the salts formed. During normal operation, no methyl ester is anticipated in the heavy phase.

The light phase 9 essentially comprises biodiesel. The latter has a content of MG of less than 0.40% by weight, preferably of less than 0.30% by weight, and a markedly reduced proportion of SMG.

The biodiesel 9 coming from the centrifugal separation then has to be conveyed into a dryer from residual water contents in a drying stage 5. The dryer is operated under negative pressure, especially under vacuum, in order thus to lower the drying temperature and at the same time save steam consumption. This provides the final product, a processed biodiesel PB.

A number of preferred specific experimental examples are presented hereinafter for better elucidation of the present invention.

EXAMPLE 1

Comparative Example

Crude biodiesel made from soybean oil was analyzed according to DIN EN 14105:2011 in respect of its glyceride content. The data are as follows (table 2):

| Mono-glycerides (% by weight) | Diglycerides (% by weight) | Triglycerides (% by weight) | Free glycerol (% by weight) | Total glycerol (% by weight) |
| --- | --- | --- | --- | --- |
| 0.38 | 0.06 | <0.01 | <0.001 | 0.106 |

1000 g of the abovementioned crude biodiesel were heated to 50° C. 3.0% by weight of demineralized water was mixed intensively with the biodiesel for several seconds. The mixture was mixed with a constant stirring speed of 100 rpm for 60 minutes at constant temperature. The mixture was centrifuged and separated into a light phase and a heavy phase by centrifugal separation. The light phase separated off was analyzed according to DIN EN 14105:2011 in respect of its glyceride content. The results are as follows (table 3):

| Mono-glycerides (% by weight) | Diglycerides (% by weight) | Triglycerides (% by weight) | Free glycerol (% by weight) | Total glycerol (% by weight) |
| --- | --- | --- | --- | --- |
| 0.38 | 0.06 | <0.01 | <0.001 | 0.106 |

As table 3 shows, there is no reduction in MG.

In addition, SMGs were analyzed both in the untreated sample and in the treated sample. The results are listed below in the following table, table 4:

| Untreated sample<br>Saturated monoglycerides<br>(% by weight) | Treated sample<br>Saturated monoglycerides<br>(% by weight) |
|---|---|
| 0.05 | 0.05 |

As can be seen from table 4, there is no reduction in SMG.

EXAMPLE 2

Example 2 was repeated but this time with addition of an aqueous alkaline solution instead of water. The conditions were as follows:

1000 g of the abovementioned crude biodiesel were heated to 50° C. 3.0% by weight of dilute sodium hydroxide solution (0.51 mol/l NaOH) was mixed intensively with the biodiesel for several seconds. The mixture was mixed with a constant stirring speed of 100 rpm for 60 minutes at constant temperature. The mixture was centrifuged and separated into a light phase and a heavy phase by centrifugal separation. The light phase separated off was analyzed according to DIN EN 14105:2011 in respect of its glyceride content.

The results were as follows (table 5):

| Mono-<br>glycerides<br>(% by<br>weight) | Diglycerides<br>(% by<br>weight) | Triglycerides<br>(% by<br>weight) | Free<br>glycerol<br>(% by<br>weight) | Total<br>glycerol<br>(% by<br>weight) |
|---|---|---|---|---|
| 0.05 | 0.1 | <0.01 | <0.001 | 0.027 |

As can be seen from table 5, the MG was reduced well below 0.30% by weight, corresponding to a reduction of 86%. The total glycerol was also reduced by the MG reduction.

In addition, SMGs were analyzed both in the untreated sample and in the treated sample. The results are listed below in the following table, table 6:

| Untreated sample<br>Saturated monoglycerides<br>(% by weight) | Treated sample<br>Saturated monoglycerides<br>(% by weight) |
|---|---|
| 0.05 | <0.01 |

As can be seen from table 6, SMG was reduced proportionally with the reduction in the MG, corresponding to a reduction of more than 80%.

In addition, sodium (Na) was analyzed using the test method DIN EN 14538 both in the untreated sample and in the treated sample. The results are listed below in the following table, table 7.

| Untreated sample<br>Sodium (mg/kg) | Treated sample<br>Sodium (mg/kg) |
|---|---|
| <0.5 | <0.5 |

As can be seen from table 7, after the treatment, sodium stays below the stipulated threshold value of the US standard ASTM D6751-15ce for grades 1-B and 2-B, below 5 mg/kg (Na+K), and of the European standard EN14214:2014-06, below 5 mg/kg (Na+K).

EXAMPLE 3

Crude biodiesel made from rapeseed oil was analyzed according to DIN EN 14105: 2011 in respect of the glyceride content. The analyzed data of the crude biodiesel are listed in table 8 below.

| Mono-<br>glycerides<br>(% by<br>weight) | Diglycerides<br>(% by<br>weight) | Triglycerides<br>(% by<br>weight) | Free<br>glycerol<br>(% by<br>weight) | Total<br>glycerol<br>(% by<br>weight) |
|---|---|---|---|---|
| 0.50 | 0.08 | <0.01 | 0.002 | 0.143 |

1000 g of the abovementioned crude biodiesel were heated to 60° C. 6.0% by weight of dilute sodium hydroxide solution (0.51 mol/L NaOH) was mixed intensively with the biodiesel for several seconds. The mixture was mixed with a constant stirring speed of 100 rpm for 60 minutes at constant temperature. The mixture was centrifuged and separated into a light phase and a heavy phase by centrifugal separation. The light phase, that is to say the biodiesel, was then washed with hot demineralized water at a temperature of 60° C. The amount of water, based on the amount of biodiesel, was 10% by weight. The water had been adjusted beforehand to a pH of 3 by addition of phosphoric acid. A centrifugal separation was subsequently effected and the light phase separated off was analyzed according to DIN EN 14105:2011 in respect of its glyceride content. The results are listed below (table 9):

| Mono-<br>glycerides<br>(% by<br>weight) | Diglycerides<br>(% by<br>weight) | Triglycerides<br>(% by<br>weight) | Free<br>glycerol<br>(% by<br>weight) | Total<br>glycerol<br>(% by<br>weight) |
|---|---|---|---|---|
| 0.28 | 0.10 | 0.01 | 0.005 | 0.088 |

As can be seen from table 9, the MG content was reduced to below 0.30% by weight, corresponding to a reduction of 44%. The total glycerol was also reduced by the MG reduction. A slight increase in diglycerides was detected.

EXAMPLE 4

Crude biodiesel made from soybean oil biodiesel was analyzed according to DIN EN 14105: 2011 in respect of the glyceride content. The analyzed data are listed in table 10 below.

| Mono-<br>glycerides<br>(% by<br>weight) | Diglycerides<br>(% by<br>weight) | Triglycerides<br>(% by<br>weight) | Free<br>glycerol<br>(% by<br>weight) | Total<br>glycerol<br>(% by<br>weight) |
|---|---|---|---|---|
| 0.60 | 0.16 | 0.07 | 0.006 | 0.19 |

1000 g of the abovementioned crude biodiesel were heated to 60° C. 3.0% by weight of dilute sodium hydroxide solution (1.05 mol/l NaOH) was mixed intensively with the biodiesel for several seconds. The mixture was mixed with a constant stirring speed of 100 rpm for 60 minutes at constant temperature. The mixture was centrifuged and separated into a light phase and a heavy phase by centrifugal separation. The light phase, that is to say the biodiesel, was then washed with hot demineralized water at a temperature of 60° C. The amount of water, based on the amount of biodiesel, was 10% by weight. The water had been adjusted beforehand to a pH of 3 by addition of phosphoric acid. A centrifugal separation was subsequently effected and the light phase separated off was analyzed according to DIN EN 14105:2011 in respect of its glyceride content. The results are listed below (table 11):

| Mono-glycerides (% by weight) | Diglycerides (% by weight) | Triglycerides (% by weight) | Free glycerol (% by weight) | Total glycerol (% by weight) |
|---|---|---|---|---|
| 0.27 | 0.19 | 0.07 | <0.001 | 0.104 |

As can be seen from table 11, the MG was reduced to below 0.30% by weight, corresponding to a reduction of 55%. The total glycerol was also reduced by the MG reduction.

In addition, SMGs were analyzed both in the untreated sample and in the treated sample. The results are listed below in the following table, table 12:

| Untreated sample Saturated monoglycerides (% by weight) | Treated sample Saturated monoglycerides (% by weight) |
|---|---|
| 0.09 | 0.04 |

As can be seen from table 12, SMG was reduced proportionally with the reduction in the MG, corresponding to a reduction of 55%.

In addition, sodium (Na) was analyzed using the test method DIN EN 14538 both in the untreated sample and in the treated sample. The results are listed below in the following table, table 13.

| Untreated sample Sodium (mg/kg) | Treated sample Sodium (mg/kg) |
|---|---|
| <1 | <1 |

As can be seen from table 12, after the treatment, sodium stays below the stipulated threshold value of the US standard ASTM D6751-15ce for grades 1-B and 2-B, below 5 mg/kg (Na+K), and of the European standard EN14214:2014-06, below 5 mg/kg (Na+K).

EXAMPLE 5

A crude biodiesel made from palm oil was analyzed in respect of the glyceride content (DIN EN 14105: 2011). The analyzed data are listed below (table 14):

| Mono-glycerides (% by weight) | Diglycerides (% by weight) | Triglycerides (% by weight) | Free glycerol (% by weight) | Total glycerol (% by weight) |
|---|---|---|---|---|
| 0.57 | 0.22 | 0.29 | 0.003 | 0.208 |

1000 g of the abovementioned crude biodiesel were heated to 60° C. 3.0% by weight of dilute sodium hydroxide solution (1.05 mol/l NaOH) was mixed intensively with the biodiesel for several seconds. The mixture was mixed with a constant stirring speed of 100 rpm for 60 minutes at constant temperature. The mixture was centrifuged and separated into a light phase and a heavy phase by centrifugal separation. The light phase, that is to say the biodiesel, was then washed with hot demineralized water at a temperature of 60° C. The amount of water, based on the amount of biodiesel, was 5% by weight. The water had been adjusted beforehand to a pH of 3 by addition of citric acid. A centrifugal separation was subsequently effected and the light phase separated off was analyzed according to DIN EN 14105:2011 in respect of its glyceride content. The results are presented below (table 15):

| Mono-glycerides (% by weight) | Diglycerides (% by weight) | Triglycerides (% by weight) | Free glycerol (% by weight) | Total glycerol (% by weight) |
|---|---|---|---|---|
| 0.30 | 0.25 | 0.30 | <0.01 | 0.143 |

As can be seen from table 15, the MG content was reduced to 0.30% by weight, corresponding to a reduction of 48%. The total glycerol was also reduced by the MG reduction. A slight increase in diglyceride was detected.

The abovementioned invention is not restricted solely to the above-described examples. It can be modified insofar as the claims listed below are complied with.

The results above show that with first-generation biodiesel, which is produced from starting materials such as, for example: soybean oil, palm oil or rapeseed oil, an uncomplicated extension of the method which is usable in a supplementary manner in any biodiesel production plant with little additional apparatus complexity, leads to increased quality of the end product.

For second-generation biodiesel, which is produced from starting materials such as, for example, used cooking oil (UCO), animal fats and/or fatty acids, this method can lead to better performance in the downstream biodiesel distillation stage, in that the amount of heavy distilled residue is reduced.

The method is therefore advantageously but not exclusively applicable to first-generation biodiesel, and is also applicable to second-generation biodiesel.

US 2010 0175312A1 and WO2015183744A1 disclose a conventional neutralization of free fatty acid during biodiesel production. In the present case, the starting material, the crude biodiesel, is already a biodiesel with a proportion of free fatty acids of less than 0.25% by weight, corresponding to an acid number of 0.5 mg KOH/g. In the European standard EN14214:2014-06 and in the US standard ASTM D6751-15ce a maximum acid number of 0.5 mg KOH/g is permitted. Furthermore, it is advantageously possible not to use any alcohol in the present method of the invention and hence to dispense with complex and costly safety measures or explosion protection measures.

REFERENCE SIGNS 1 addition of aqueous alkaline solution
2 first centrifugal separation
3 washing
4 second centrifugal separation
5 drying
6 heavy phase
7 light phase
8 heavy phase 9 light phase
CB crude biodiesel
PB processed biodiesel
S aqueous alkaline solution
W water
A acid

The invention claimed is:

1. A method for reducing the content of monoglycerides (MG) in a crude biodiesel (CB) which has a content of monoglycerides (MG) of between 0.4% and 0.7% by weight and a content of free fatty acids (FFA) of less than or equal to 0.25% by weight, characterized by the following steps:
   A provision of the crude biodiesel (CB) with the abovementioned ingredients in the abovementioned concentrations;
   B addition (1) of an alkaline aqueous solution (S) in the form of sodium hydroxide solution to the crude biodiesel (CB), wherein the NaOH concentration in the sodium hydroxide solution is less than 4.03 mol/l and wherein the amount of sodium hydroxide solution metered in is between 1.0% and 3.0% by weight, based on the amount of crude biodiesel (CB) and wherein the temperature of the crude biodiesel (CB) during the addition of the aqueous alkaline solution (S) is at least 30° C.;
   C mixing of the alkaline aqueous solution (S) to hydrolyze glycerides in the biodiesel, preferably monoglycerides (MG);
   wherein the holding time after addition of the aqueous alkaline solution (S) and before the first centrifugal separation (2) is at least 15 minutes;
   D first centrifugal separation (2) of a heavy phase (6), comprising the alkaline aqueous solution (S) with the hydrolyzed ingredients, from a light phase (7) comprising the biodiesel by a separator at a speed of 4400 to 7200 rpm;
   E drying (5) of the light phase (7) and/or (9) to provide a processed biodiesel (PB) for use as fuel with a content of monoglycerides of less than 0.4% by weight,
   wherein the content of methanol in the biodiesel in steps A-E is less than 0.7% by weight, based on the total weight of crude biodiesel (CB) used or processed biodiesel (PB) in the respective step.

2. The method as claimed in claim 1, characterized in that, after the centrifugal separation (2) as per step D and before the drying (5) as per step E, washing (3) of the light phase (7) with water (W) and/or with a dilute acid (A) is effected, as is a second centrifugal separation (4) of a heavy phase (8) comprising the water (W) or the dilute acid (A), and any precipitated salts of cations of the alkaline aqueous solution (S) added, from a light phase (9) comprising the biodiesel.

3. The method as claimed in claim 1, characterized in that the NaOH concentration in the sodium hydroxide solution is between 0.51 mol/l and 2.77 mol/l.

4. The method as claimed in claim 1, characterized in that the temperature of the crude biodiesel (CB) during the addition of the aqueous alkaline solution (S) is at least 50° C.

5. The method of claim 1, characterized in that the holding time after the addition of the aqueous alkaline solution (S) and before the first centrifugal separation (2) is 30 to 180 minutes.

6. The method as claimed in claim 2, characterized in that the pH of the dilute acid during the washing (3) is between pH=3 and pH=5.

7. The method as claimed in claim 2, characterized in that the dilute acid is a phosphoric and/or citric acid.

8. The method as claimed in claim 1, characterized in that the content of methanol in the biodiesel in steps A-E is less than 0.2% by weight based on the total weight of crude biodiesel (CB) used or processed biodiesel (PB) in the respective step.

9. The method as claimed in claim 1, characterized in that steps A-E are effected without addition of alcohol to the crude biodiesel or to the intermediate product from the crude biodiesel during the method steps used in the method.

10. The method as claimed in claim 1, characterized in that steps A-E are effected without addition of hydrogen to the crude biodiesel or to the intermediate product from the crude biodiesel during the method steps used in the method.

11. The method as claimed in claim 1, characterized in that the monoglycerides (MG) are saturated monoglycerides (SMG).

12. The method as claimed in claim 1, characterized in that the crude biodiesel (CB) has a content of monoacylglycerides of between 0.41% to 0.69% by weight.

13. The method as claimed in claim 8, characterized in that the total alcohol content in the biodiesel in steps A-E is less than 0.2% by weight based on the total weight of crude biodiesel (CB) used or processed biodiesel (PB) in the respective step.

14. The method as claimed in claim 8, characterized in that the content of methanol in the biodiesel in steps A-E is less than 0.05% by weight, based on the total weight of crude biodiesel (CB) used or processed biodiesel (PB) in the respective step.

* * * * *